US007409109B2

(12) United States Patent
Jeffrey

(10) Patent No.: US 7,409,109 B2
(45) Date of Patent: Aug. 5, 2008

(54) APPARATUSES AND METHODS FOR INCORPORATING A BORDER WITHIN AN IMAGE BY DEFINING A PORTION OF THE BORDER

(75) Inventor: Eric Jeffrey, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 891 days.

(21) Appl. No.: 10/869,391

(22) Filed: Jun. 16, 2004

(65) Prior Publication Data

US 2005/0281486 A1 Dec. 22, 2005

(51) Int. Cl.
*G06K 9/32* (2006.01)
*G06K 9/54* (2006.01)
*G06K 9/00* (2006.01)

(52) U.S. Cl. ........................................ 382/296; 382/305

(58) Field of Classification Search ................. 382/173, 382/181, 189, 194, 199, 286, 289, 276–278, 382/291, 296, 305, 309; 345/430, 433, 435, 345/437, 509, 543, 544, 619, 629, 634, 649; 348/588; 715/223
See application file for complete search history.

(56) References Cited

U.S. PATENT DOCUMENTS 5,063,605 A * 11/1991 Samad ........................ 382/293
5,600,412 A 2/1997 Connors
5,666,549 A * 9/1997 Tsuchiya et al. ............ 715/223
5,754,186 A 5/1998 Tam et al.
5,815,157 A 9/1998 Bowen
6,262,746 B1 7/2001 Collins
6,369,830 B1 4/2002 Brunner et al.
6,515,677 B1 2/2003 Lee et al.
2005/0281486 A1* 12/2005 Jeffrey ........................ 382/309
2006/0056728 A1* 3/2006 Silverbrook et al. ........ 382/276

FOREIGN PATENT DOCUMENTS

WO WO 02/082414 A2 10/2002

* cited by examiner

*Primary Examiner*—Amir Alavi
(74) *Attorney, Agent, or Firm*—Mark P. Watson

(57) ABSTRACT

A hardware implemented method for incorporating a border region within an image region is provided. In this method, a portion of the border region is stored in memory. Thereafter, a determination is made as to a relative position of a pixel within the image region. An image pixel or each pixel of the portion of the border region is then fetched from the memory dependent upon the relative position of the pixel. An apparatus and display controller for incorporating a border region within an image region are also described.

28 Claims, 10 Drawing Sheets

UPPER LEFT CORNER PORTION
(0° ROTATION)

UPPER RIGHT CORNER PORTION
(90° CLOCKWISE ROTATION)

LOWER LEFT CORNER PORTION
(270° CLOCKWISE ROTATION)

LOWER RIGHT CORNER PORTION
(180° CLOCKWISE ROTATION)

TOP SIDE PORTION
(0° ROTATION)

LEFT SIDE PORTION
(270° CLOCKWISE ROTATION)

RIGHT SIDE PORTION
(90° CLOCKWISE ROTATION)

BOTTOM SIDE PORTION
(180° CLOCKWISE ROTATION)

APPARATUSES AND METHODS FOR INCORPORATING A BORDER WITHIN AN IMAGE BY DEFINING A PORTION OF THE BORDER

CROSS REFERENCE TO RELATED APPLICATIONS

This application is related to U.S. patent application Ser. No. 10/859,654, filed on Jun. 3, 2004, and entitled "Apparatuses and Methods for Incorporating a Border Within an Image." The disclosure of this application is incorporated herein by reference in its entirety for all purposes.

BACKGROUND OF THE INVENTION

1. Field of the Invention

This invention relates generally to computer graphics and, more particularly, to methods and apparatuses for incorporating a border within an image.

2. Description of the Related Art

In computer graphics, a border is commonly placed around an image being displayed. FIG. 1 is an illustration of a conventional method to implement the border around the image. Currently, to place border 102 around image 106, a graphics controller must use an overlay 108 that is equal in size to the image. Overlay 108 includes border 102 and center area 104 that is programmed to be transparent. Thus, even though border 102 comprises only a portion of an area of image 106, the number of overlay pixels being stored equals the number of image pixels. In addition, extra circuitry is needed to process the transparent pixels in center area 104 within overlay 108, which consumes additional power and bandwidth.

As a result, many small, portable devices have problems processing a border overlay because these devices typically have limited power, memory, and computing capability. Since these devices are limited in their memory and computing power, processing the overlays may exceed the memory limitations and dominate the CPU cycles of these devices and, as a result, dramatically slow down the executed applications.

In view of the foregoing, there is a need to provide apparatuses and methods for reducing the memory requirements and CPU processing power required to implement a border.

SUMMARY OF THE INVENTION

Broadly speaking, the present invention fills these needs by providing hardware implemented methods and an apparatus for incorporating a border region within an image region. It should be appreciated that the present invention can be implemented in numerous ways, including as a method, a system, or a device. Several inventive embodiments of the present invention are described below.

In accordance with a first aspect of the present invention, a hardware implemented method for incorporating a border region within an image region is provided. In this method, a relative position of a pixel within the image region is first computed. Subsequently, a determination is made as to whether the pixel is located in the border region based on the relative position of the pixel. If the relative position of the pixel is in the border region, then an order to fetch a border pixel from a border memory block is calculated. The order defines a rotation of a portion of the border region. The border pixel is then fetched from the border memory according to the calculated order. However, if the relative position of the pixel is in the image region, then an image pixel is fetched from a main memory block.

In accordance with a second aspect of the present invention, a hardware implemented method for incorporating a border region within an image region is provided. In this method, a relative position of a pixel within the image region is first computed. Thereafter, the relative position of the pixel is compared with a border region width to determine whether the pixel is located in the border region. If the relative position of the pixel is in the border region, then a corner pixel is fetched from a corner memory block if the pixel is located in a corner portion of the border region. Otherwise, a side pixel is fetched from a side memory block if the pixel is located in a side portion of the border region. However, if the relative position of the pixel is in the image region, then an image pixel is fetched from a main memory block.

In accordance with a third aspect of the present invention, a hardware implemented method for incorporating a border region within an image region is provided. In this method, a portion of the border region is stored in memory. Thereafter, a determination is made as to a relative position of a pixel within the image region. An image pixel or each pixel of the portion of the border region is then fetched from the memory dependent upon the relative position of the pixel.

In accordance with a fourth aspect of the present invention, a display controller for incorporating a border region within an image region is provided. The display controller includes a memory. The memory includes a first memory block configured to store an image pixel, a second memory block configured to store a corner pixel, and a third memory block configured to store a side pixel. The display controller also includes a memory controller configured to fetch one of the image pixel, the corner pixel, or the side pixel. Further, a main image fetching circuit in communication with the memory controller is included in the display controller. The main image fetching circuit includes logic for comparing a relative position of a pixel with a border region width to determine whether the pixel is located in the border region, logic for fetching the corner pixel from the second memory block, logic for fetching the side pixel from the third memory block, and logic for fetching the image pixel from the first memory block.

In accordance with a fifth aspect of the present invention, an apparatus for incorporating a border region within an image region is provided. The apparatus includes a display controller. The display controller includes circuitry for computing a relative position of a pixel within the image region, circuitry for fetching a border pixel from a border memory block, circuitry for rotating the border pixel, and circuitry for fetching an image pixel from a main memory block. Furthermore, the apparatus includes a central processing unit (CPU) in communication with the display controller and a display in communication with the display controller, whereby the display enables the display of the image region.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for hardware implemented methods and an apparatus for incorporating a border region within an image region. It will be obvious, however, to one skilled in the art, that the present invention may be practiced without some or all of these specific details. In other instances, well known process operations have not been described in detail in order not to unnecessarily obscure the present invention.

The embodiments described herein provide an apparatus, display controllers, and hardware implemented methods for incorporating a border region within an image region. Essentially, instead of storing an entire overlay, a portion of the overlay that comprises the border region is stored in memory. In one embodiment, as will be explained in more detail below, a main image fetching circuit is first accessed to determine a relative position of a pixel within an image region. Depending on the relative position of the pixel, either an image pixel or a pixel of the portion of the border region is fetched from memory, and the portion may be rotated to maintain symmetry of the border region.

Figure 1:
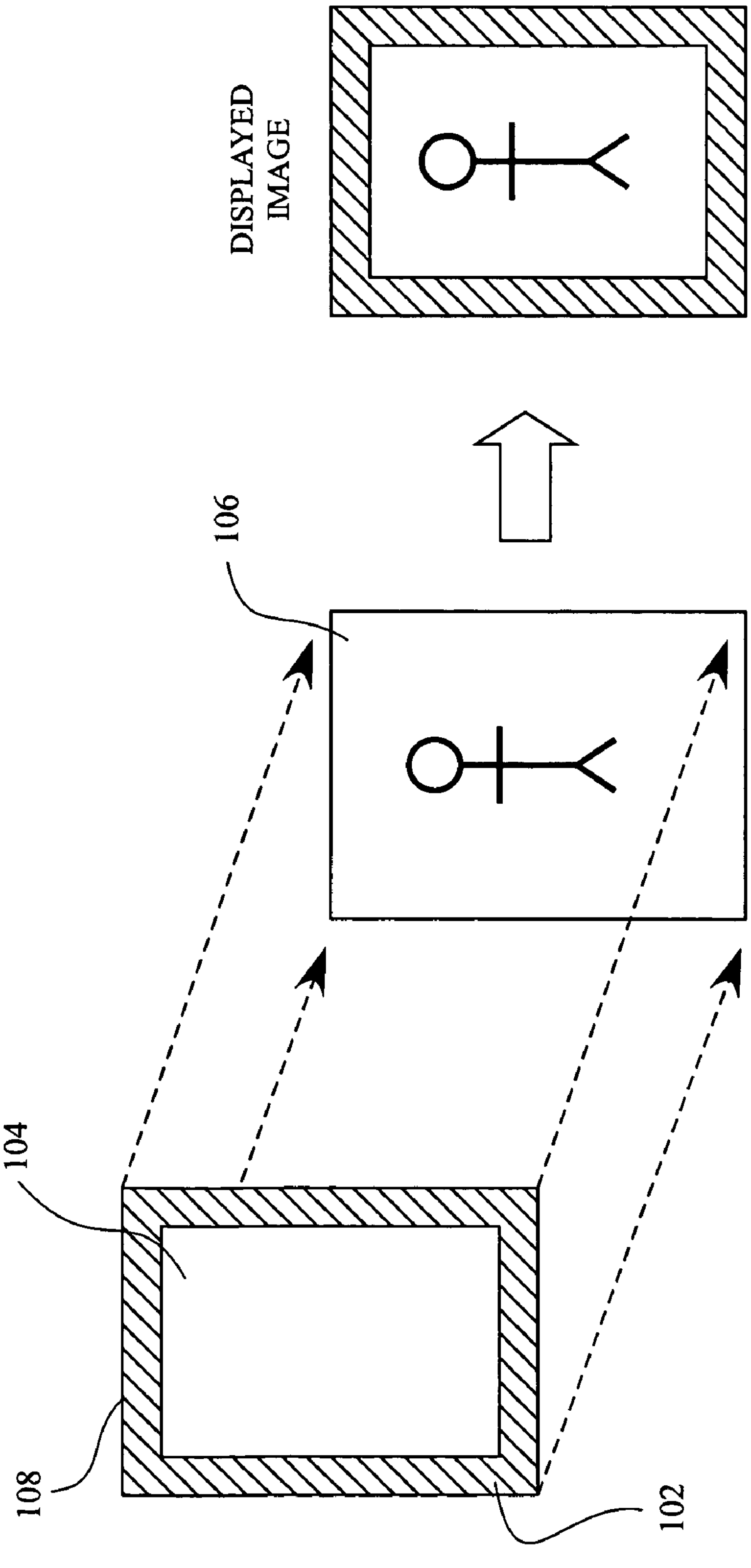
FIG. 1 (PRIOR ART)
FIG. 1 is an illustration of a conventional method to implement a border around an image.
Figure 2:
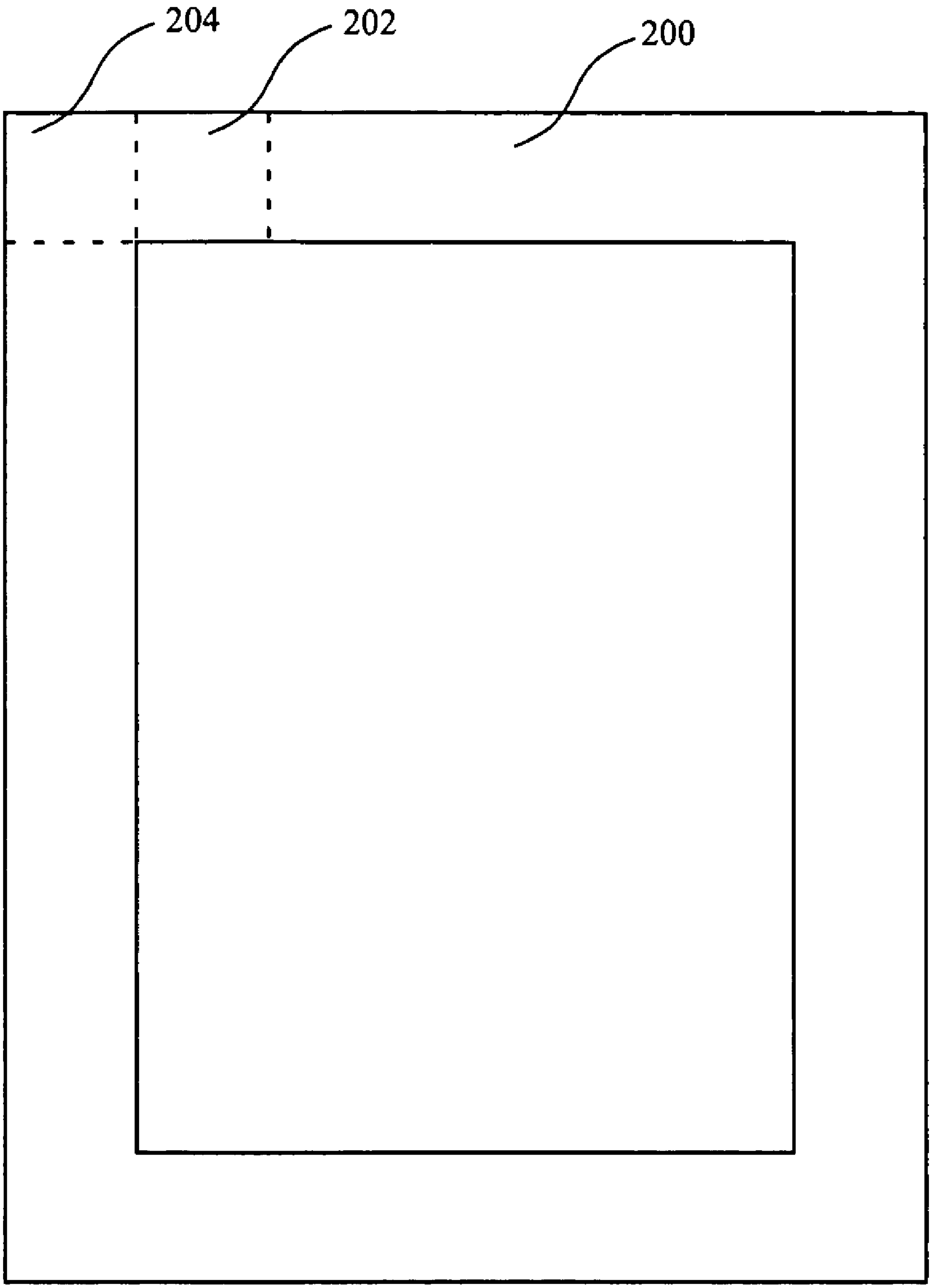
FIG. 2 illustrates a border region with a corner portion and a side portion, in accordance with one embodiment of the present invention.

FIG. 2 illustrates the border region with a corner portion and a side portion, in accordance with one embodiment of the present invention. In a symmetrical border with repetitive patterns, the border may be reduced to two basic portions from which the entire border region 200 may be constructed. As shown in FIG. 2, border region 200 includes corner portion 204 and side portion 202. The first portion (i.e., corner portion 204) defines the four corners of border region 200. The second portion (i.e., side portion 202) defines the rest of border region 200. In one embodiment, depending on the position of corner portion 204 and side portion 202 within border region 200, the corner portion and the side portion may be rotated to maintain symmetry. In effect, border region 200 may be constructed from multiple, rotated copies of corner portion 204 and side portion 202. Additionally, the geometry of corner portion 204 and side portion 202 may not necessarily be a "square" shape as shown in FIG. 2, but may be any suitable shape and size, for example, rectangles, triangles, parallelograms, etc.

Figure 3:
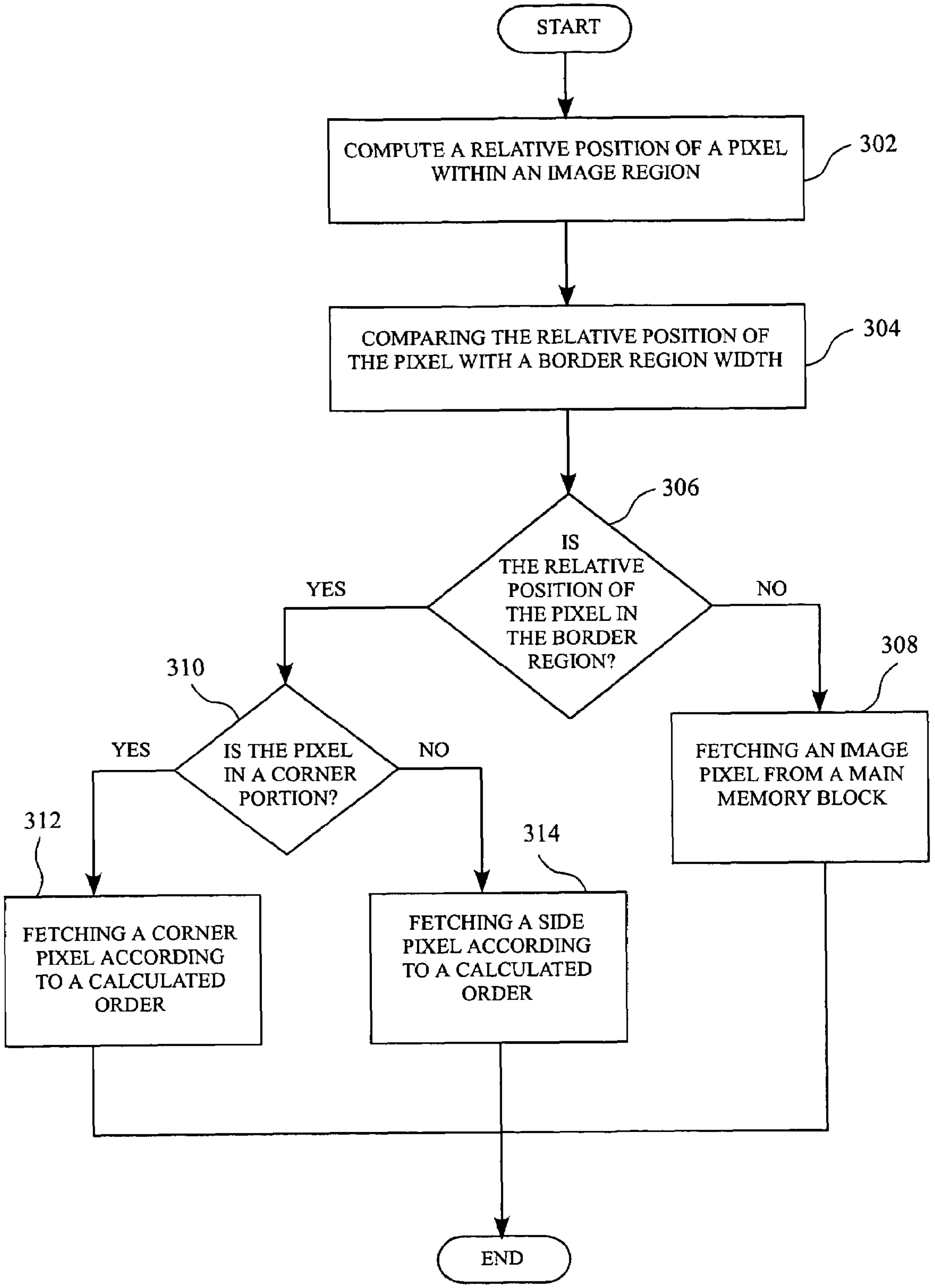
FIG. 3 is a flowchart diagram of a high level overview of a hardware implemented method for incorporating a border region within an image region, in accordance with one embodiment of the present invention.

FIG. 3 is a flowchart diagram of a high level overview of a hardware implemented method for incorporating a border region within an image region, in accordance with one embodiment of the present invention. As shown in FIG. 3, starting at operation 302, the relative position of the pixel is computed within the image region. As will be explained in more detail below, the relative position of the pixel is then compared with a border region width in operation 304 to determine whether the pixel is located in the border region.

As shown in operation 306, in one embodiment, dependent upon the relative position of the pixel, an image pixel, a corner pixel, or a side pixel is fetched. In this embodiment, it should be appreciated that the border region can be derived from two distinct portions—a corner portion and a side portion. The corner pixels and the side pixels comprise the corner portion and the side portions, respectively.

If the relative position of the pixel is in the image region, then the image pixel is fetched from the main memory in operation 308. However, if the relative position of the pixel is in the border region, then another check is conducted in operation 310 to determine whether the pixel is located in a corner portion of the border region. If the pixel is located in a corner portion, then a corner pixel is fetched from a corner memory block in operation 312. If the pixel is not located in the corner portion, then the pixel is located in a side portion and a side pixel is fetched from a side memory block in operation 314. In one embodiment, the corner portions and the side portions are rotated to maintain symmetry of the border. That is, dependent on the exact side or corner of the border, the retrieved order of the pixels from the side or corner portion is adjusted. As will be explained in more detail below, one exemplary method to rotate the corner portions and the side portions is to calculate an order to fetch the pixels from the corner memory block and the side memory block. The calculated order defines a rotation of the corner portions and the side portions. In other words, the corner portions and the side portions can be rotated by varying the memory address order from which the pixels are fetched from memory.

Figure 4:
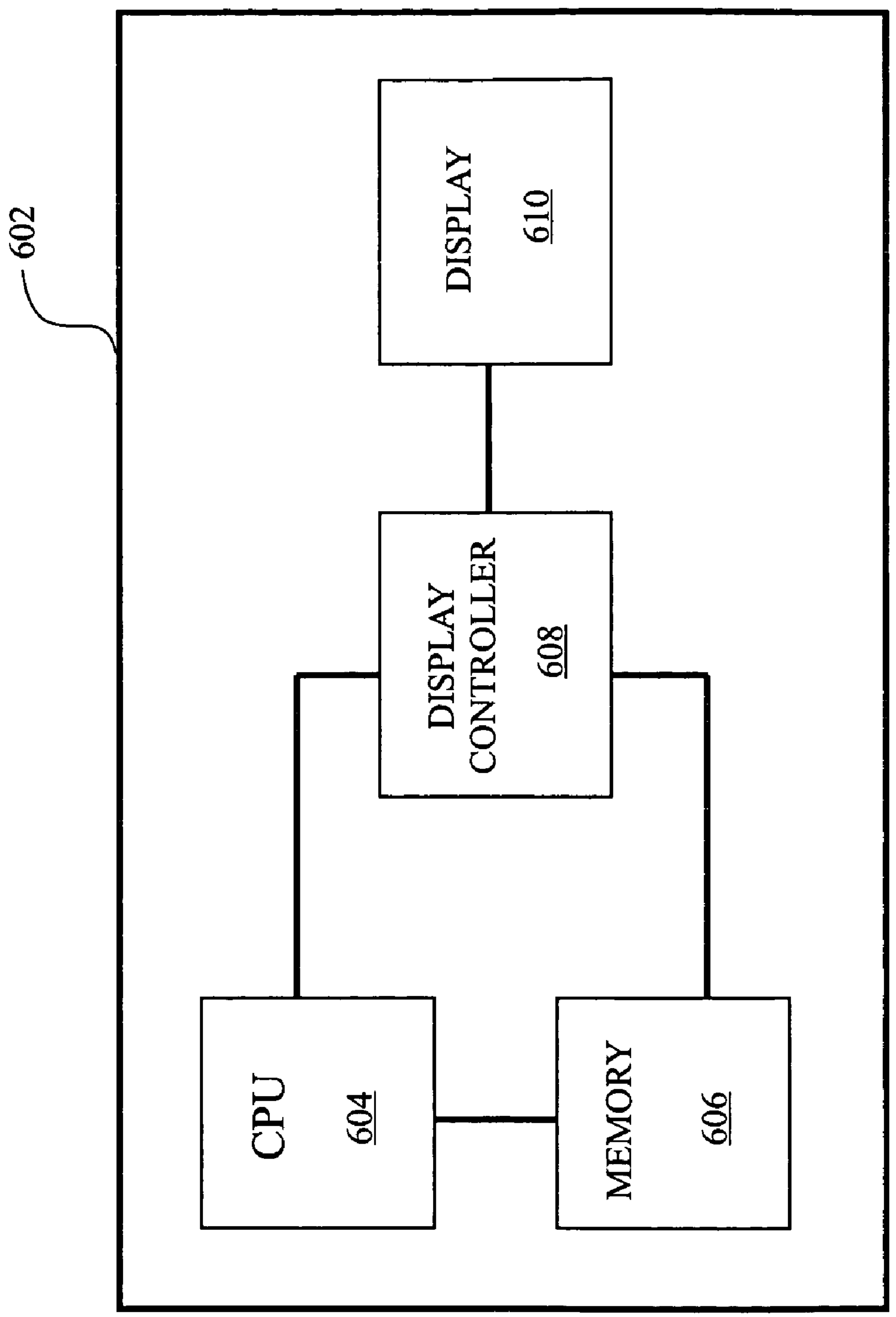
FIG. 4 is a simplified schematic diagram of an apparatus for incorporating a border region within an image region, in accordance with one embodiment of the present invention.

FIG. 4 is a simplified schematic diagram of an apparatus for incorporating a border region within an image region, in accordance with one embodiment of the present invention. Apparatus 602 includes any suitable type of computing device. For example, apparatus 602 may be a personal digital assistant, a cell phone, a web tablet, a pocket personal computer, etc. As shown in FIG. 4, apparatus 602 includes central processing unit (CPU) 604, memory 606, display controller 608, and display 610. Display 610 may include liquid crystal (LCD) displays, thin-film transistor (TFT) displays, cathode ray tube (CRT) monitors, televisions, etc. Examples of memory 606 include static access memory (SRAM), dynamic random access memory (DRAM), etc.

Display controller 608 is in communication with CPU 604, memory 606, and display 610. In one embodiment, pixels are stored in a memory included within display controller 608. In another embodiment, memory 606, which is in communication with CPU 604, may also be configured to store the pixels. One skilled in the art will appreciate that while CPU 604, memory 606, and display controller 608 are illustrated as being interconnected, each of these components may be in communication through a common bus.

The functionality described above for incorporating a border region within an image region is incorporated into display controller 608. In one embodiment, display controller 608 contains the circuitry for computing a relative position of a pixel with the image region, circuitry for fetching the corner pixel from a corner memory block, circuitry for fetching a side pixel from a side memory block, and circuitry for fetching an image pixel from a main memory block. Display 610, which is coupled to display controller 608, then displays the corresponding image pixels or border pixels.

It will be apparent to one skilled in the art that the functionality described herein may be synthesized into firmware through a suitable hardware description language (HDL). For example, the HDL (e.g., VERILOG) may be employed to synthesize the firmware and the layout of the logic gates for providing the necessary functionality described herein to provide a hardware implementation of the border region incorporation techniques and associated functionalities. Thus, the embodiments described herein may be captured in any suitable form or format that accomplishes the functionality described herein and is not limited to a particular form or format.

Figure 5:
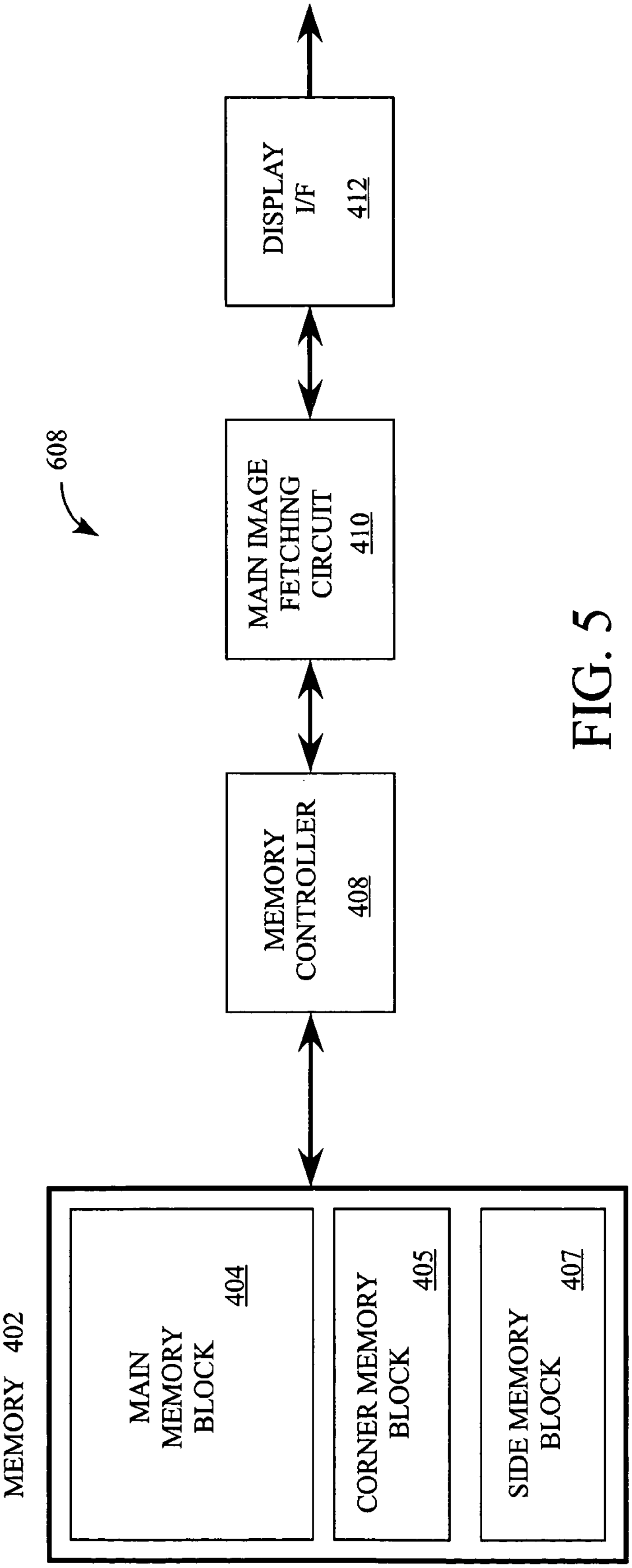
FIG. 5 is a more detailed schematic diagram of the display controller shown in FIG. 4, in accordance with one embodiment of the present invention.

FIG. 5 is a more detailed schematic diagram of the display controller shown in FIG. 4, in accordance with one embodiment of the present invention. As shown in FIG. 5, display controller 608 includes memory 402, memory controller 408, main image fetching circuit 410, and display interface 412. Memory 402 includes any suitable type of memory such as SRAM, DRAM, etc. In one embodiment, memory 402 is divided into separate main memory 404, corner memory 405, and side memory 407 blocks. Main memory block 404 stores image pixels, corner memory block 405 stores corner pixels, and side memory block 407 stores side pixels. Alternatively, in another embodiment, the pixels may be stored in a memory region located outside display controller 608. Display interface 412, which is in communication with main image fetching circuit 410, provides an interface to a display.

In one embodiment, main image fetching circuit 410 includes logic for fetching an image pixel, a corner pixel, or a side pixel dependent upon the relative position of the pixel. For example, main image fetching circuit 410 includes logic for fetching the corner pixel from corner memory block 405 if the relative position of the pixel is in a border region and the pixel is located within the corner portion of the border region. However, if the relative position of the pixel is in an image region, then main image fetching circuit 410 includes logic for fetching the image pixel from main memory block 404. As will be explained in more detail below, main image fetching circuit 410 also includes the logic for computing the relative position of the pixel within the image region, the logic for comparing the relative position of the pixel with a border region width to determine whether the pixel is located in the border region, and logic for calculating an order to fetch the pixel, whereby the order defines a rotation of a portion of the border region.

Figure 6:
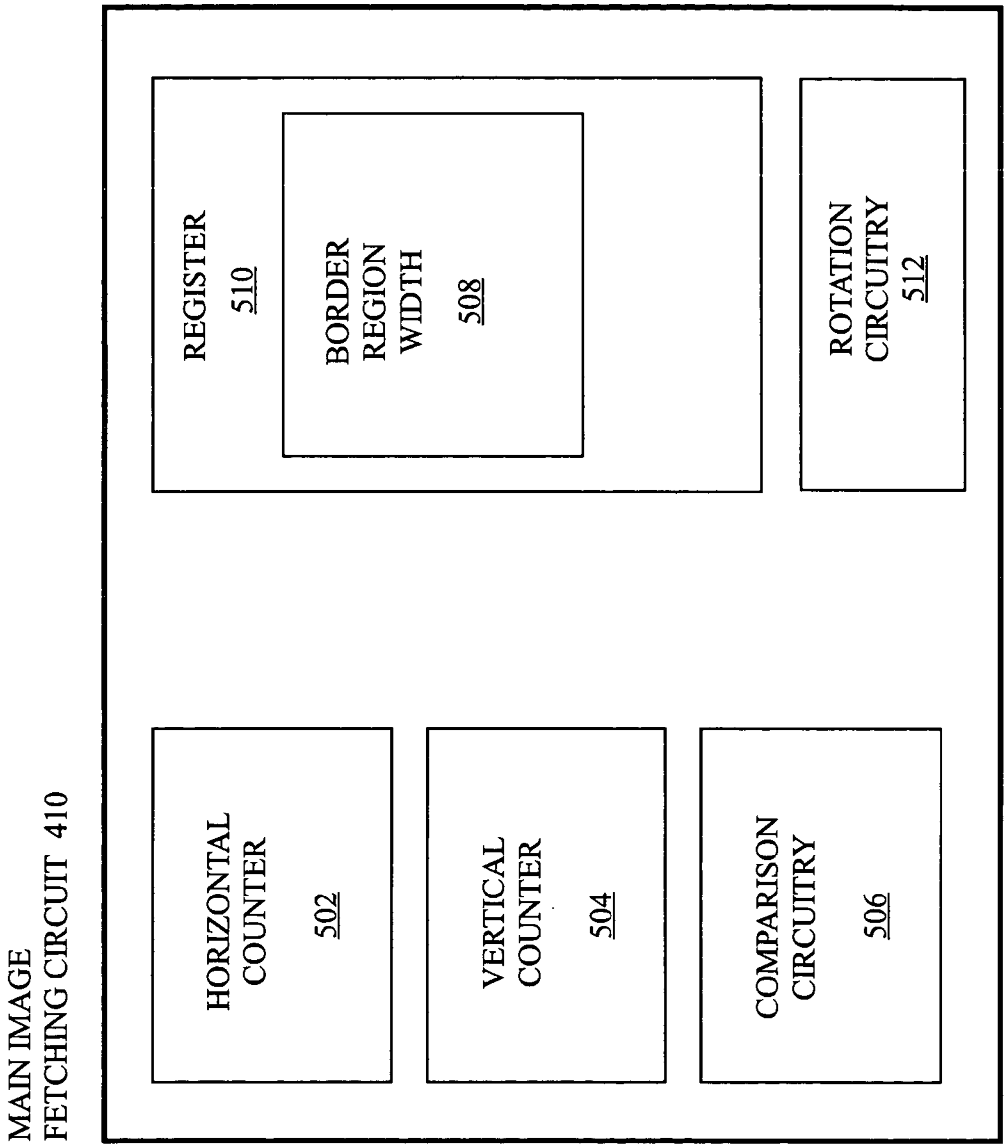
FIG. 6 is a more detailed block diagram of the main image fetching circuit shown in FIG. 5, in accordance with one embodiment of the present invention.

FIG. 6 is a more detailed block diagram of the main image fetching circuit shown in FIG. 5, in accordance with one embodiment of the present invention. As shown in FIG. 6, main image fetching circuit 410 includes horizontal counter 502, vertical counter 504, comparison circuitry 506, rotation circuitry 512, and register 510. As discussed above, main image fetching circuit 410 is accessed to compute a relative position of a pixel within an image region as the pixel is being output for display. To compute the relative position of the pixel, the pixel is tracked by one or more counters. In one embodiment, main image fetching circuit 410 includes horizontal counter 502 to track the pixel position along a horizontal direction and vertical counter 504 to track the pixel position along a vertical direction. It should be appreciated that an image is refreshed on a display from left to right in the horizontal direction and from top to bottom in the vertical direction. To track the pixels, horizontal counter 502 and vertical counter 504 are incremented by one when transitioning to a next pixel for display. For example, as a first pixel is being output along a horizontal line from left to right, horizontal counter 502, which initially has a zero count value, increments by one. Thus, the relative position of the first pixel along the horizontal direction is identified by a count value of one. When transitioning to an adjacent pixel column for display along the same horizontal line, horizontal counter 502 increments from a count value of one to a count value of two. As such, the relative position of the adjacent pixel along the same horizontal line is identified by a count value of two. In this way, horizontal counter 502 keeps track of each pixel along the horizontal direction. Similarly, vertical counter 504 keeps track of each pixel using the same method described above when transitioning to a next pixel row within an image region. Vertical counter 504 increments based on horizontal counter 502 reaching a count corresponding to the end of a row. Thus, vertical counter 504 captures transitions to successive rows. In effect, incrementing horizontal counter 502 and vertical counter 504 computes the relative position or X and Y coordinates of the pixels within the image region. Additionally, the counters may not necessarily increment by a value of one, but may increment by any suitable values (e.g., two, three, four, etc.). In another embodiment, main image fetching circuit 410 may include one counter to track the pixels. Here, as each pixel is being displayed, the counter increments by one. As such, each pixel is identified by a unique count value. As is known to those skilled in the art, a separate calculation is then applied to convert the unique count values to X and Y coordinates of the pixels within the image region.

In addition, main image fetching circuit 410 includes comparison circuitry 506 and register 510 to determine whether the pixels are located within a border region. In one embodiment, comparison circuitry 506 includes logic for comparing the relative position of the pixels with border region width 508 (e.g., comparators). Border region width 508 is a value that specifies a thickness of the border region and, in one embodiment, is stored in register 510. Alternatively, in another embodiment, border region width 508 may be stored in a central register located outside of main image fetching circuit 410. It should be appreciated that the border region may not be uniform. For example, the border region may have separate different vertical border width and horizontal border width that specify the thickness of border region along the vertical direction and along the horizontal direction, respectively. In this embodiment, register 510 stores two values that specify the vertical border width and the horizontal border width.

As shown in FIG. 6, main image fetching circuit 410 also includes rotation circuitry 512. In one embodiment, rotation circuitry 512 includes logic for calculating an order to fetch the pixels from a corner memory block and a side memory block. The calculated order defines a rotation of the corner portions and the side portions. In other words, the order is a calculated association of a pixel position within the image with a memory address of an image pixel stored in memory. For example, FIGS. 7A-7D are simplified diagrams illustrating the order of memory addresses being fetched when corner portion 702 is rotated, in accordance with one embodiment of the present invention. FIGS. 7A-7D illustrate an upper left corner portion, an upper right corner portion, a lower left corner portion, and a lower right corner portion. For illustrative purposes, each square within corner portion 702 represents a pixel. Each number (e.g., 1, 2, 3, 4, etc.) within the square represents a memory address associated with the pixel. The memory address is a number assigned to each pixel that is used to track where each pixel is stored in memory. The memory address can be any suitable bit-width. For example, in one embodiment, the memory address is eight bits in length. In another embodiment, the memory address is sixteen bits in length and so on.

Figure 7A:
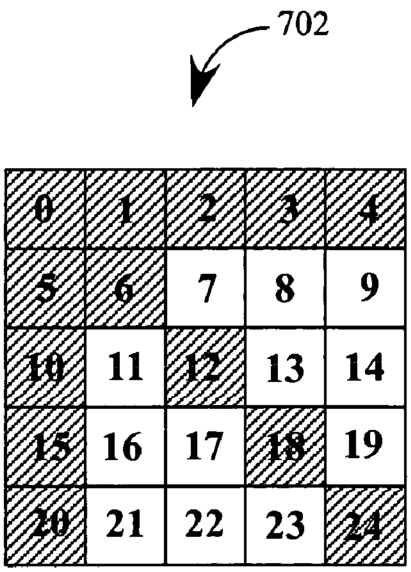
FIGS. 7A, 7B, 7C, and 7D are simplified diagrams illustrating the order of memory addresses being fetched when corner portion is rotated, in accordance with one embodiment of the present invention.

As shown in FIGS. 7A-7D, twenty five squares (i.e., 5×5 array of pixels) comprise corner portion 702. Each pixel is associated with a memory address number. For instance, as shown in FIG. 7A, at zero degrees rotation, a pixel positioned at the top left hand corner of corner portion 402 has an exemplary memory address of zero and another pixel positioned at the top right hand corner of the same corner portion has a memory address of four.

Figure 7B:
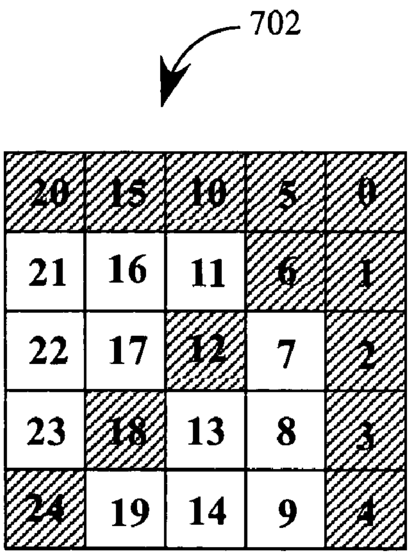
Figure 7C:
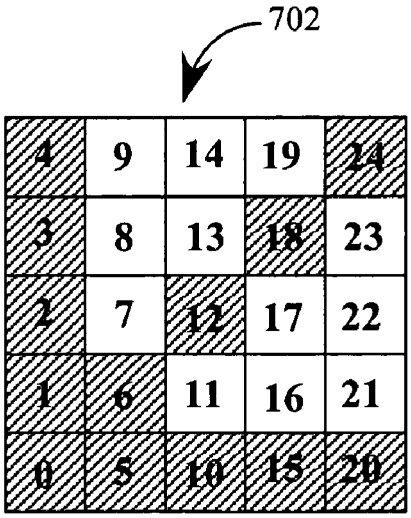
Figure 7D:
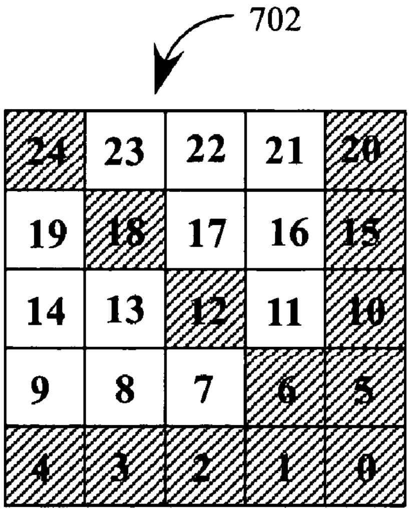

In this case, the particular order in which the pixels are fetched from memory defines the rotation of corner portion 702. In other words, corner portion 702 is rotated by associating a pixel position with different memory addresses. For instance, FIG. 7B shows corner portion 702 rotated ninety degrees clockwise to define an upper right corner portion, FIG. 7D shows the corner portion rotated 180 degrees clockwise to define a lower right corner portion, and FIG. 7C shows the corner portion rotated 270 degrees clockwise to define a lower left corner portion. For example, at zero degree rotation, the pixel positioned at the top left hand corner of corner portion 702 shown in FIG. 7A is associated with the memory address of zero. After a ninety degrees clockwise rotation, the same pixel positioned at the top left hand corner of corner portion 702 shown in FIG. 7B is associated with a different memory address of twenty. Consequently, at zero degree rotation, the pixels that comprise a top, horizontal line of corner portion 702 shown in FIG. 7A are fetched from left to right in order from memory addresses 0, 1, 2, 3, and 4. To rotate corner portion 702 ninety degrees clockwise to define the upper right corner portion, pixels that comprise the top, horizontal line of corner portion 702 shown in FIG. 7B are fetched from left to right in order from memory addresses 20, 15, 10, 5, and 0. It should be appreciated that the data in memory does not change, but the fetch order of the data from memory changes. For reference purposes, the rotations shown in FIGS. 7A-7D are about a reference point located at the center of corner portion 702, however, it should be appreciated that the reference point may be located anywhere outside or inside the corner portion.

Figure 8A:
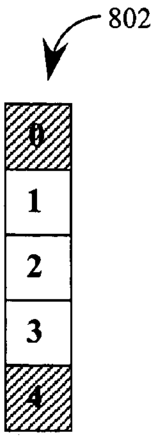
FIGS. 8A, 8B, 8C, and 8D are simplified diagrams illustrating the order of memory addresses being fetched when side portion is rotated, in accordance with one embodiment of the present invention.
Figure 8B:
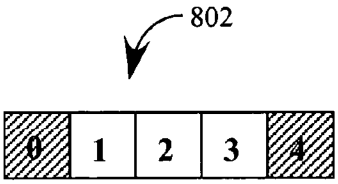
Figure 8C:
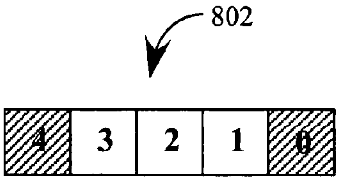
Figure 8D:
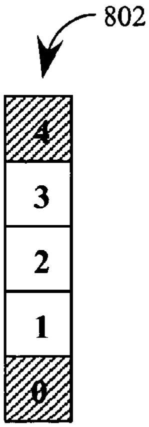

FIG. 8A-8D are simplified diagrams illustrating the order of memory addresses being fetched when side portion 802 is rotated, in accordance with one embodiment of the present invention. Side portion 802 defines portions of the border region that are not the corner portions. FIGS. 8A-8D illustrate a top side portion, a right side portion, a bottom side portion, and a left side portion. Side portion 802 is not required to have the same shape and dimension as the corner portion. In this example, five squares (i.e., 1×5 array of pixels) comprise side portion 802. FIG. 8C shows side portion 802 rotated ninety degrees clockwise to define a right side portion, FIG. 8D shows the side portion rotated 180 degrees clockwise to define a bottom side portion, and FIG. 8B shows the side portion rotated 270 degrees clockwise to define a left side portion. Again, for reference purposes, the rotations are about a reference point located at the center of side portion 802.

Similarly, the particular order in which the pixels are fetched from memory defines the rotation of side portion 802. For example, at zero degree rotation, the pixel positioned at the top of side portion 802 shown in FIG. 8A is associated with the memory address of zero. After a 180 degrees clockwise rotation, the same pixel positioned at the top of side portion 802 shown in FIG. 8D is associated with a different memory address of four.

Figure 9:
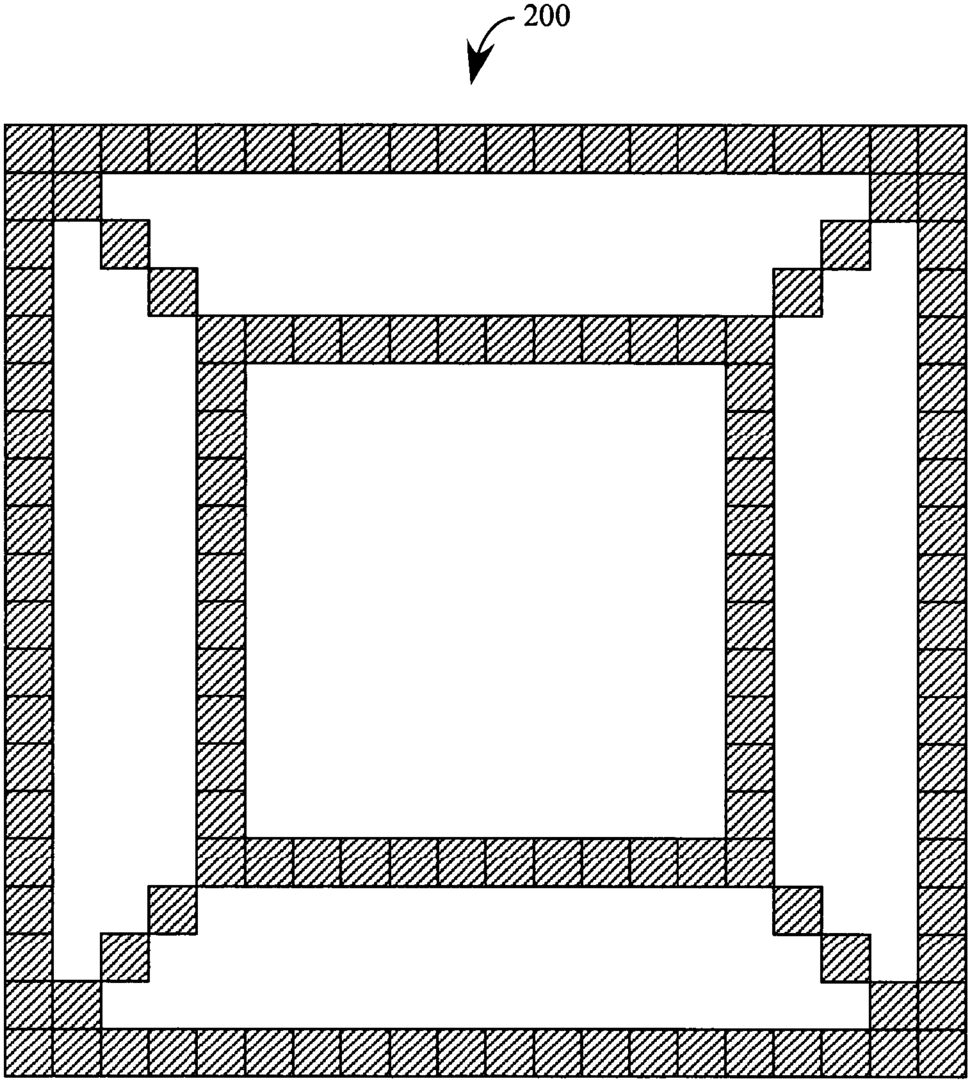
FIG. 9 illustrates a border region comprised of the corner portions shown in FIGS. 7A-7D and side portions shown in FIGS. 8A-8D, in accordance with one embodiment of the present invention.

FIG. 9 illustrates a border region comprised of the corner portions shown in FIGS. 7A-7D and side portions shown in FIGS. 8A-8D, in accordance with one embodiment of the present invention. As shown in FIG. 9, border region 200 is a 20×20 pixel image made up of the corner portions and side portions shown in FIGS. 7A-7D and 8A-8D, respectively. In other words, border region is a composite of copies of corner portion and side portion. To maintain symmetry of border region, the corner portions and side portions are rotated accordingly.

As discussed above, in one embodiment, the main image fetching circuit includes the logic to generate a memory address order to fetch the pixels from memory. In this example, the main image fetching circuit would generate the following memory address order for a first line of the 20×20 pixel image shown in FIG. 9:

$$\{0,1,2,3,4,0,0,0,0,0,0,0,0,0,0,20,15,10,5,0\}.$$

The above memory address order is comprised of twelve portions, namely two corner portions and ten side portions. The first five memory addresses of {0,1,2,3,4} are associated with the top line of an upper left corner portion shown in FIG. 7A. The next ten memory address of {0,0,0,0,0,0,0,0,0,0} are associated with ten copies of a top pixel of the top side portion shown in FIG. 8A. The last five memory addresses of {20,15, 10,5,0} are associated with the top line of an upper right corner portion shown in FIG. 7B. In like manner, the memory image fetching circuit generates the order to fetch pixels for each line of the 20×20 image to produce border region 200.

Figure 10:
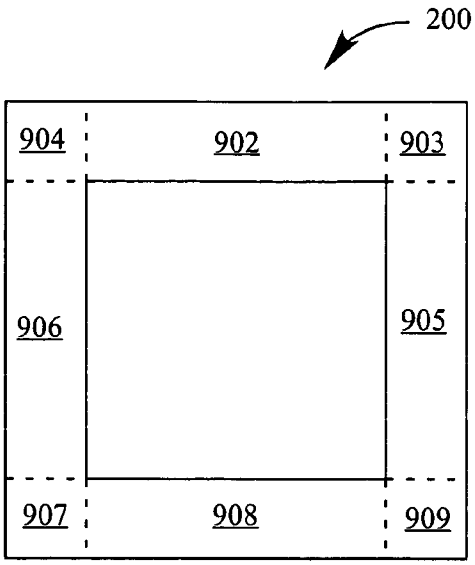
FIG. 10 illustrates the border region with distinct corner portions and side portions, in accordance with one embodiment of the present invention.

FIG. 10 illustrates the border region with distinct corner portions and side portions, in accordance with one embodiment of the present invention. As shown in FIG. 10, instead of two distinct portions as discussed above, border region 200 includes four distinct corner portions 903, 904, 907, and 909, and four side portions 902, 905, 906, and 908. Each portion is stored in separate memory blocks and fetched accordingly. FIG. 2 and FIG. 10 show border region 200 being derived from two portions and eight portions, respectively. However, it should be appreciated that border region 200 may be derived or divided into any suitable portions. For example, in one embodiment, border region 200 may comprise only one repeated portion. Furthermore, rotation of each portion is optional. For example, the portions of FIG. 10 may not need to be rotated as the image associated with each portion may already be rotated. However, the portions shown in FIG. 9 need to be rotated to maintain symmetry. As a result, border region 200 may be divided into any suitable portions and any suitable number of portions may be rotated if necessary.

The embodiments described herein are also capable of supporting border regions that have non-linear edges. Essentially, non-linear edges are made possible by the inclusion of transparent pixels. With non-linear edges, border region is defined by a border region width that includes visible parts and transparent parts of the border region. Transparent parts are comprised of pixels that are transparent. By mixing transparent pixels with visible pixels, non-linear edges may be defined. As is known to those skilled in the art, each pixel is defined by a number of bits (e.g., eight, sixteen bits, etc.) and the bits define whether the pixel is transparent. For example, a transparency register has a particular eight bit value. If an eight bit value of a pixel matches the transparency register, then the pixel is transparent. This may also be referred to as a key color.

Figure 11:
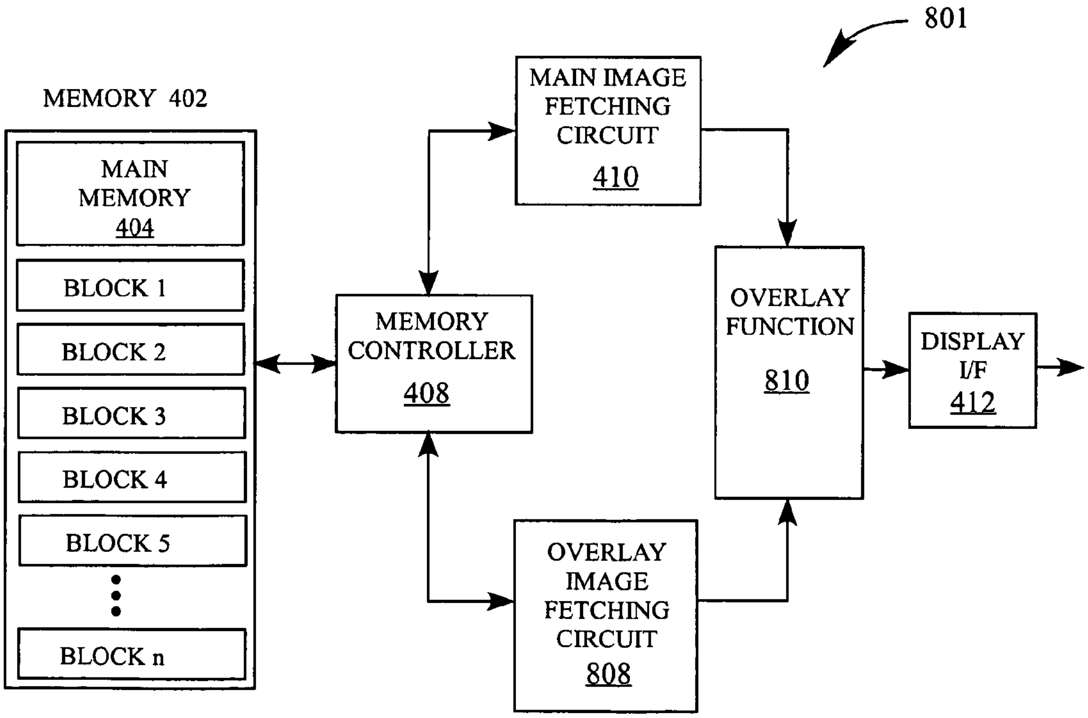
FIG. 11 is a detailed schematic diagram of a display controller that can incorporate non-linear border edges, in accordance with one embodiment of the present invention.

FIG. 11 is a detailed schematic diagram of a display controller that can incorporate non-linear border edges, in accordance with one embodiment of the present invention. Similar to the display controller of FIG. 5, display controller 801 includes memory 402, memory controller 408, main image fetching circuit 410, and display interface 412. However, display controller 801 of FIG. 11 also includes overlay image fetching circuit 808 and overlay function module 810. As shown in FIG. 11, memory 402 included within display controller 802 has main memory block 404 to store image pixels and additional blocks to store border region pixels. Each block stores pixels that comprise a portion of the border region, and it should be appreciated that memory 402 may be divided into any suitable number of blocks to correspond with the number of portions that comprise the border region.

Main image fetching circuit 410 also includes the logic for fetching an image pixel, a corner pixel, or a side pixel dependent upon the relative position of a pixel as discussed above. However, in this embodiment, when the pixel is located in the border region, main image fetching circuit 410 and overlay image fetching circuit 808 simultaneously fetch the image pixel and the border pixel (e.g., corner pixel, side pixel, etc.), respectively. Thereafter, the border pixel is analyzed to determine whether the border pixel is transparent. The value of the border pixel determines transparency as described above. If the border pixel is not transparent, then the border pixel is selected for display within the border region. If the border pixel is transparent, then the image pixel is selected instead for display within the border region.

For example, a relative position of a pixel within an image region is first computed, and the relative position is then compared with a border region width to determine whether the pixel is located in the border region. If the relative position of the pixel is in the image region, then main image fetching circuit 410 fetches an image pixel from main memory block 404 for display. However, if the relative position of the pixel is in the border region, then main image fetching circuit 410 fetches the image pixel from main memory block 404. At the same time, overlay image fetching circuit 808 fetches the border pixel from an appropriate block. Subsequently, overlay function module 810 analyzes the border pixel to determine whether the border pixel is transparent. If the border pixel is not transparent, overlay function module 810 selects the border pixel for display within the border region. If the border pixel is transparent, overlay function module 810 selects the image pixel instead for display within the border region.

Alternatively, the display controller of FIG. 5 may also be configured to incorporate non-linear border edges, in accordance with one embodiment of the present invention. Returning to FIG. 5, a relative position of a pixel is first computed, and the relative position is compared with a border region width to determine whether the pixel is located in the border region. If the relative position of the pixel is in an image region, then main image fetching circuit 410 fetches an image pixel from main memory block 404 for display. However, if the relative position of the pixel is in the border region, then main image fetching circuit 410 first fetches a border pixel from either corner memory block 405 or side memory block 407, respectively. Main image fetching circuit 410 then analyzes the border pixel, i.e., the value associated with each border pixel, to determine whether the border pixel is transparent. If the border pixel is not transparent, then main image fetching circuit 410 sends the border pixel to display interface 412 for display. However, if the border pixel is transparent, main image fetching circuit 410 then fetches image pixel from main memory block 404 for display.

In summary, the above described invention provides an apparatus, display controllers, and hardware implemented methods to incorporate a border region within an image region. When compared to the conventional method of storing an entire overlay, storing a portion of the overlay that comprises the border region and fetching the pixels accordingly significantly reduce memory space. For example, under the conventional method, the 20×20 image as shown in FIG. 9 requires 400 pixels to be stored in memory. The present invention requires merely 30 pixels to be stored in memory, which is a 92.5% saving in memory space. For a 100×100 image, the savings would be 99.7%. As such, the larger the image, the greater the savings in memory space. Extra circuitry to process transparent pixels may also be eliminated. Thus, the reduction of memory space and the elimination of extra circuitry require less processing power and bandwidth. As a result, small, portable devices with limited power, memory, and computing capability incorporating the above described invention can adequately process and incorporate borders.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

The invention claimed is:

1. A hardware implemented method for incorporating a border region within an image region, comprising the method operations of:

computing a relative position of a pixel within the image region;

determining whether the pixel is located in the border region based on the relative position of the pixel;

if the relative position of the pixel is in the border region, calculating an order to fetch a border pixel from a border memory block, the order defining a rotation of a portion of the border region, fetching the border pixel from the border memory block according to the calculated order; and if the relative position of the pixel is in the image region, fetching an image pixel from a main memory block.

2. The hardware implemented method of claim 1, wherein the method operation of fetching the border pixel from the border memory region includes, if the pixel is in a corner portion of the border region, fetching a corner pixel from a first memory block according to the calculated order; and if the pixel is in a side portion of the border region, fetching a side pixel from a second memory block according to the calculated order.

3. The hardware implemented method of claim 2, wherein the corner portion of the border region is defined by one of an upper left corner portion, an upper right corner portion, a lower left corner portion, or a lower right corner portion.

4. The hardware implemented method of claim 2, wherein the side portion of the border region is defined by one of a left side portion, a right side portion, a top side portion, or a bottom side portion.

5. The hardware implemented method of claim 1, wherein the method operation of determining whether the pixel is located in the border region includes, comparing the relative position of the pixel with a border region width.

6. The hardware implemented method of claim 5, wherein the method operation of computing the relative position of the pixel within the image region includes, tracking the pixel along a horizontal position and along a vertical position.

7. The hardware implemented method of claim 6, wherein the method operation of determining whether the pixel is located in the border region includes, comparing the horizontal position with a horizontal border width; and comparing the vertical position with a vertical border width.

8. The hardware implemented method of claim 1, wherein the rotation is defined by one of a 0 degrees rotation, a 90 degrees rotation, an 180 degrees rotation, or a 270 degrees rotation.

9. The hardware implemented method of claim 1, further comprising:

repeating each of the method operations for a next pixel.

10. The hardware implemented method of claim 1, wherein the method operation of fetching the border pixel from the border memory includes, fetching the image pixel from the main memory block if the border pixel is transparent.

11. The hardware implemented method of claim 1, wherein the method operation of fetching the border pixel from the border memory block includes, fetching the image pixel from the main memory block;

selecting the border pixel for display if the border pixel is not transparent; and selecting the image pixel for display if the border pixel is transparent.

12. A hardware implemented method for incorporating a border region within an image region, comprising the method operations of:

computing a relative position of a pixel within the image region;

comparing the relative position of the pixel with a border region width to determine whether the pixel is located in the border region;

if the relative position of the pixel is in the border region, fetching a corner pixel from a corner memory block if the pixel is located in a corner portion of the border region, fetching a side pixel from a side memory block if the pixel is located in a side portion of the border region; and if the relative position of the pixel is in the image region, fetching an image pixel from a main memory block.

13. The hardware implemented method of claim 12, wherein the method operation of fetching the corner pixel from the corner memory block includes, calculating an order to fetch the corner pixel from the corner memory block, the order defining a rotation of the corner portion; and fetching the corner pixel from the corner memory block according to the calculated order.

14. The hardware implemented method of claim 12, wherein the method operation of fetching the side pixel from the side memory block includes, calculating an order to fetch the side pixel from the side memory block, the order defining a rotation of the side portion; and fetching the side pixel from the side memory block according to the calculated order.

15. The hardware implemented method of claim 12, wherein the corner portion of the border region is defined by one of an upper left corner portion, an upper right corner portion, a lower left corner portion, or a lower right corner portion.

16. The hardware implemented method of claim 15, further comprising:

fetching an upper left corner pixel from an upper left corner memory block if the pixel is located in the upper left corner portion of the border region;

fetching an upper right corner pixel from an upper right corner memory block if the pixel is located in the upper right corner portion of the border region;

fetching a lower left corner pixel from a lower left corner memory block if the pixel is located in the lower left corner portion of the border region; and fetching an lower right corner pixel from a lower right corner memory block if the pixel is located in the lower right corner portion of the border region.

17. The hardware implemented method of claim 12, wherein the side portion of the border region is defined by one of a left side portion, a right side portion, a top side portion, or a bottom side portion.

18. The hardware implemented method of claim 17, further comprising:

fetching a left side pixel from a left side memory block if the pixel is located in the left side portion of the border region;

fetching a right side pixel from a right side memory block if the pixel is located in the right side portion of the border region;

fetching a top side pixel from a top side memory block if the pixel is located in the top side portion of the border region; and fetching a bottom side pixel from a bottom side memory block if the pixel is located in the bottom side portion of the border region.

19. A hardware implemented method for incorporating a border region within an image region, comprising the method operations of:

storing a portion of the border region in memory;

determining a relative position of a pixel within the image region;

fetching an image pixel or each pixel of the portion of the border region from the memory dependent upon the relative position of the pixel, the fetching including:

calculating an order to fetch the each pixel of the portion of the border region, the order defining a rotation of the portion of the border region; and fetching the each pixel of the portion of the border region according to the calculated order.

20. The hardware implemented method of claim 19, wherein the determining the relative position of the pixel within the image region includes comparing the relative position of the pixel with a border region width.

21. A display controller for incorporating a border region within an image region, comprising:

a memory including, a first memory block configured to store an image pixel, a second memory block configured to store a corner pixel, a third memory block configured to store a side pixel;

a memory controller configured to fetch one of the image pixel, the corner pixel, or the side pixel; and a main image fetching circuit in communication with the memory controller, the main image fetching circuit including, logic for comparing a relative position of a pixel with a border region width to determine whether the pixel is located in the border region, logic for fetching the corner pixel from the second memory block, logic for fetching the side pixel from the third memory block, logic for fetching the image pixel from the first memory block.

22. An apparatus for incorporating a border region within an image region, comprising:

a display controller including, circuitry for computing a relative position of a pixel within the image region, circuitry for fetching a border pixel from a border memory block, circuitry for rotating the border pixel, circuitry for fetching an image pixel from a main memory block;

a central processing unit (CPU) in communication with the display controller; and a display in communication with the display controller, the display enabling the display of the image region.

23. The display controller of claim 22, wherein the main image fetching circuit includes, logic for calculating a first order to fetch the corner pixel from the second memory block, the first order defining a rotation of a corner portion of the border region; and logic for calculating a second order to fetch the side pixel from the third memory block, the second order defining a rotation of a side portion of the border region.

24. The display controller of claim 22, wherein the logic for fetching the corner pixel from the second memory block includes, logic for fetching the image pixel from the first memory block;

selecting the corner pixel for display if the corner pixel is not transparent; and selecting the image pixel for display if the corner pixel is transparent.

25. The apparatus of claim 22, further comprising:

a memory in communication with the CPU.

26. The apparatus of claim 22, wherein the display is selected from the group consisting of a liquid crystal display (LCD), a thin-film transistor (TFT) display, a cathode ray tube (CRT) monitor, and a television.

27. The apparatus of claim 22, wherein the circuitry for fetching the border pixel from the border memory block includes, circuitry for fetching a corner pixel from a corner memory block if the pixel is in a corner portion of the border region; and circuitry for fetching a side pixel from a side memory block if the pixel is in a side portion of the border region.

28. The apparatus of claim 27, wherein the circuitry for rotating the border pixel includes, circuitry for rotating the corner pixel about a reference point, the reference point being defined relative a portion of the border region; and circuitry for rotating the side pixel about the reference point.

* * * * *